US009593626B2

(12) United States Patent
Crover et al.

(10) Patent No.: US 9,593,626 B2
(45) Date of Patent: Mar. 14, 2017

(54) RADIAL ENGINE PISTON-CRANKSHAFT INTERFACES

(71) Applicants: Joseph B Crover, Gresham, OR (US); Stephen E Crover, Damascus, OR (US)

(72) Inventors: Joseph B Crover, Gresham, OR (US); Stephen E Crover, Damascus, OR (US)

( * ) Notice: Subject to any disclaimer, the term of this patent is extended or adjusted under 35 U.S.C. 154(b) by 127 days.

(21) Appl. No.: 14/799,733

(22) Filed: Jul. 15, 2015

(65) Prior Publication Data

US 2016/0017795 A1 Jan. 21, 2016

Related U.S. Application Data

(60) Provisional application No. 62/026,117, filed on Jul. 18, 2014.

(51) Int. Cl.

| | |
|---|---|
| ***F16C 11/02*** | (2006.01) |
| ***F02B 75/22*** | (2006.01) |
| ***F01B 9/02*** | (2006.01) |
| ***F01B 1/06*** | (2006.01) |
| *F02B 75/32* | (2006.01) |

(52) U.S. Cl.

CPC .......... *F02B 75/222* (2013.01); *F01B 1/0634* (2013.01); *F01B 9/02* (2013.01); *F02B 75/32* (2013.01)

(58) Field of Classification Search

CPC .......... F02B 75/222; F02B 75/32; F01B 9/02; F01B 1/0634

USPC ......................... 123/197.3, 197.4, 54.1, 54.2

See application file for complete search history.

(56) References Cited

U.S. PATENT DOCUMENTS 3,017,229 A * 1/1962 Dilworth ............. F16C 33/1085 384/288
5,119,770 A * 6/1992 Graham .................. F02B 75/22 123/197.4
5,765,451 A * 6/1998 Carone ................. F02B 75/224 123/197.3
6,941,837 B2 * 9/2005 Rummel ................. F16C 7/023 123/43 R

* cited by examiner

*Primary Examiner* — Marguerite McMahon

(74) *Attorney, Agent, or Firm* — Mohr Intellectual Property Law Solutions, PC

(57) ABSTRACT

Improved radial engine configurations where the pistons and their associated connecting rods interface with a center crankshaft by the use of slipper bearings, which only contact a portion of the center crankshaft throw. The improved radial engine crankshaft interface includes at least one connecting rod with a bearing that encircles the center crankshaft throw, and acts as a retaining ring for the slipper bearings.

20 Claims, 8 Drawing Sheets

RADIAL ENGINE PISTON-CRANKSHAFT INTERFACES

CROSS REFERENCE TO RELATED APPLICATIONS

This application claims priority to U.S. Provisional Application Ser. No. 62/026,117, filed on Jul. 18, 2014, which is hereby incorporated by reference for all purposes.

BACKGROUND

The present disclosure relates generally to internal combustion engines. In particular, improvements to the design of the interface between pistons and the crankshaft of internal combustion engines in a radial configuration are described.

It is well known in the general aviation industry that the trend is towards a reduction of pilots and flights due to high expenses in nearly all aspects of aviation, and lower operational costs are needed at a minimum to reverse this trend. One aspect of increasing concern to the future viability of widespread general aviation is the cost and availability of fuel. The vast majority of lower cost general aviation planes use reciprocating engines that burn avgas, a highly-refined version of the gasoline used in cars. Because of its specialized and limited purpose, the price of avgas is continually increasing, while its long term availability is also in question. Because of these factors, confidence in the current state of reciprocating aviation engines is in decline. Thus, an advanced piston engine design that can burn cheaper and more readily available Jet-A can bring benefits of reduced operational cost, reduced environmental impact and foster improvements in airframe design, all of which will aid in the reversal of the decline of general aviation.

Once such promising design is a compression-ignition (diesel) radial engine. A radial engine configuration has a set of cylinders arranged radially in a single plane around a common crankshaft hub. Examples of alternative engine configurations include inline, V and opposed. In comparison to these alternative configurations, a radial configuration has superior engine density, which results in a superior power to weight ratio, desirable for aircraft propulsion purposes. This can be greatly enhanced by implementing the engine using a two-stroke combustion cycle, with fuel being burned with each down stroke of each piston, as opposed to every other down stroke as required by a four-stroke combustion cycle.

Known radial engine configurations are not entirely satisfactory for the range of applications in which they are employed, however. For example, existing radial engines typically employ some version of a master-and-articulating-rod assembly, with one cylinder possessing a master connecting rod that typically bolts to a crankshaft throw, the connecting rods for the remaining cylinders attaching around the master connecting rod, to which in turn are attached each of the pistons. This configuration adds complexity, weight to the drive train, presents a myriad of failure points, and prevents a uniform piston motion. By using a two-stroke combustion cycle, a simpler, lighter alternative can be implemented: a connecting rod with a slipper bearing design, where the slipper is a portion of a circle (arc segment) that interfaces directly with the crankshaft throw. However, because each piston typically lies in a common plane, the size of the slipper is limited by the need to avoid collision with the slippers of adjacent connecting rods. Moreover, as the number of cylinders in the common plane increases, the maximum slipper size and corresponding contact area with the crankshaft decreases. As each slipper is responsible for transmission of power from its piston during combustion, smaller slippers will wear faster and be more prone to failure due to the concentration of force in an increasingly smaller area. Thus, it is generally accepted in the prior art that there can be no more than four cylinders in a given cylinder plane and still maintain an acceptable amount of slipper to crankshaft contact area, which in turn severely limits the scalability of a radial engine employing a slipper bearing design.

Thus, there exists a need for improved radial engine piston-crankshaft interfaces that improve upon and advance the design of known slipper bearing designs. Examples of new and useful radial engine piston-crankshaft interfaces relevant to the needs existing in the field are discussed below.

Disclosure addressing one or more of the identified existing needs is provided in the detailed description below. Examples of references relevant to improved radial engine piston-crankshaft interfaces include U.S. Pat. Nos. 5,197,416 and 2,199,655. The complete disclosures of the above patents and patent applications are herein incorporated by reference for all purposes.

SUMMARY

The present disclosure is directed to an improved radial engine configuration where the pistons and their associated connecting rods interface with a center crankshaft by the use of slipper bearings, which only contact a portion of the center crankshaft throw. The improved radial engine crankshaft interface includes a connecting rod with a bearing that encircles the center crankshaft throw, and acts as a retaining ring for the slipper bearings of the remaining connecting rods.

DETAILED DESCRIPTION

The disclosed radial engine piston-crankshaft interface will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various radial engine piston-crankshaft interfaces are provided. Related features in the examples may be identical, similar, or dissimilar in different examples For the sake of brevity, related features not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1A:
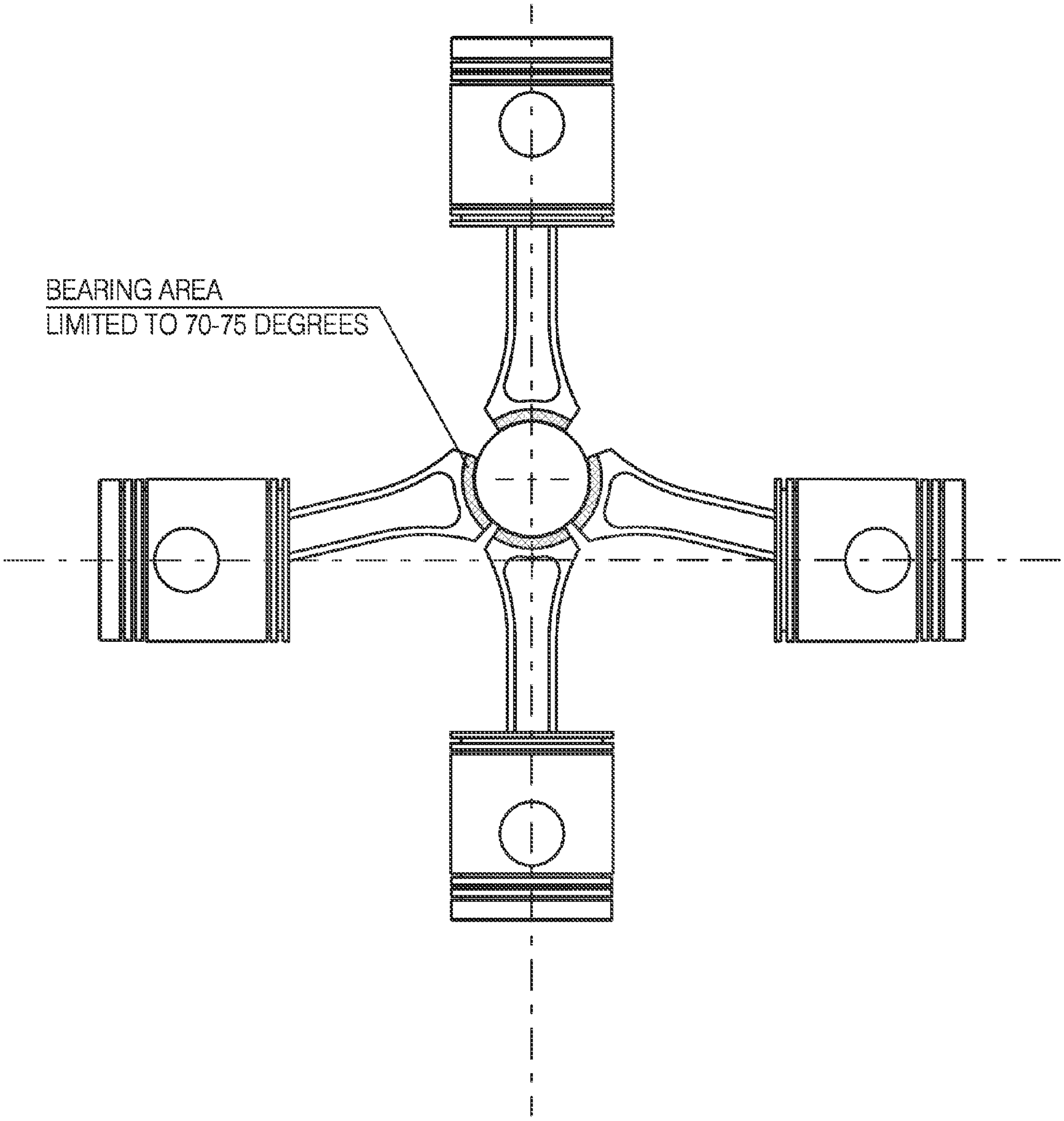
FIG.1A PRIOR ART
FIGS. 1A and 1B are diagram views of prior art arrangements of radial engine cylinders and their piston-crankshaft interfaces.
Figure 1B:
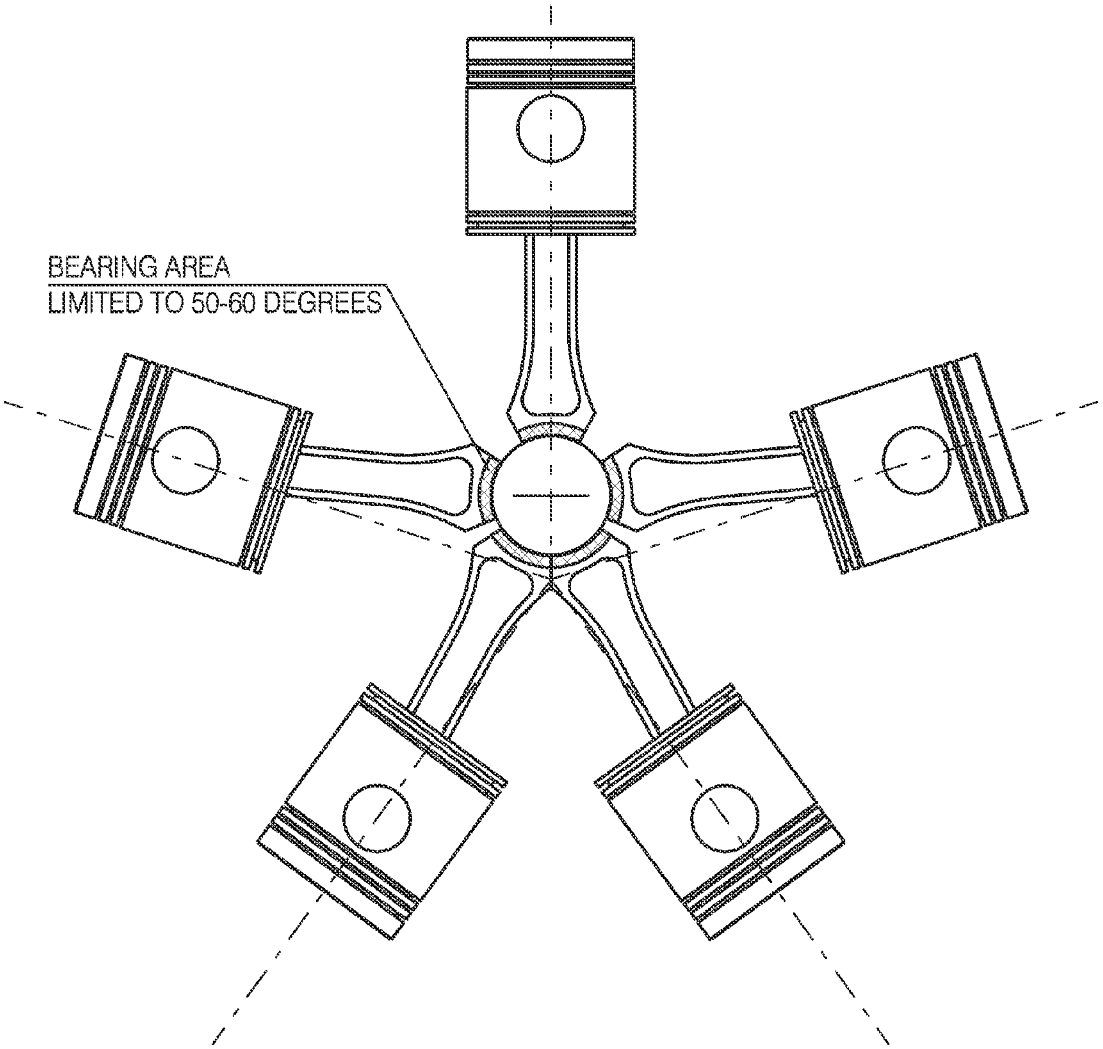
FIG.1B PRIOR ART

FIGS. 1A and 1B illustrate the current state of art for interfacing connecting rods to a common crankshaft throw using slipper bearings. As each additional connecting rod end reduces the amount of bearing area on the common crankshaft throw, the load carrying ability of the journal bearing is correspondingly increasingly limited. These geometrical constraints reduce this to a realistic working maximum of four cylinders; ideally, the number of connecting rods sharing crankshaft bearing space is less than four. As can be seen in FIGS. 1A and 1B, as the number of slipper bearings in a single plane increases, the bearing area gets progressively smaller. With four pistons, the maximum bearing area is limited to 70-75 degrees, depicted in FIG. 1A, and with five pistons in one plane, the maximum bearing area drops to between 50-60 degrees. As the maximum bearing area drops, the forces exerted by the piston on each combustion cycle are concentrated into a smaller area, which approaches the limit of the ability of the engine oil to keep the bearings lubricated and moving over an oil film. Loss of this oil film, even momentarily, can result in metal to metal contact, which leads to premature wear of the slipper bearings, increases the possibility of engine failure, and decreases the corresponding time interval between engine overhauls as increased inspection and replacement frequency becomes necessary to ensure acceptable engine reliability.

The foregoing considerations impose a practical limit to the number of pistons with slipper bearing connecting rods that can be placed into a single plane. Additionally, this slipper end arrangement may require a secondary standalone retaining ring to hold the connecting rods to the crankshaft throw due to any unusual load conditions and base engine geometry retaining requirements during assembly and nonoperation.

A solution to this limit is to slightly offset the plane of several of the cylinders relative to each other thus allowing a small number of the whole to work on one, two, three or possibly four bearing areas of the common crankshaft throw. This allows each individual slipper bearing end to wrap around the crankshaft throw farther to create the adequate bearing area for proper function. However complexity is added back into the connection as multiple retaining rings may be need to be deployed to hold the connection.

The solution presented by the disclosed invention is to arrange no more than four, but preferably two to three, cylinders in a front plane on single center crankshaft throw, a single cylinder in a middle plane, and no more than four, but preferably two to three, cylinders around a rear plane. This arrangement can be seen in FIG. 4B, where the cylinders are shown in a staggered configuration. The front and rear connecting rod sets are of a slipper type while the middle connecting rod is a traditional full capture connecting rod. This full capture connecting rod also has an integral retaining ring for the front and rear slipper connecting rods. The disclosed invention thus allows at least live cylinders to be arranged radially around a common crankshaft throw on a two-stroke engine using multiple slipper bearings, without reducing the contact area of each slipper bearing on the common crankshaft throw to an unacceptably small portion.

With reference to FIGS. 2-5B, an improved radial engine piston-crankshaft interface as described above, radial engine crankshaft interface 100, will now be described. Radial engine crankshaft interface 100 functions to provide a novel assembly layout of pistons 102, associated connecting rods 108 and 109, and how they are interfaced to central crankshaft 104, that results in a radial engine having greater than four pistons 102 arranged around a single crankshaft throw 106 and using a slipper bearing interface to have a maximal amount of slipper bearing contact area with central crankshaft 104. The reader will appreciate from the figures and description below that radial engine crankshaft interface 100 addresses shortcomings of conventional radial engine crankshaft interface arrangements.

Figure 2:
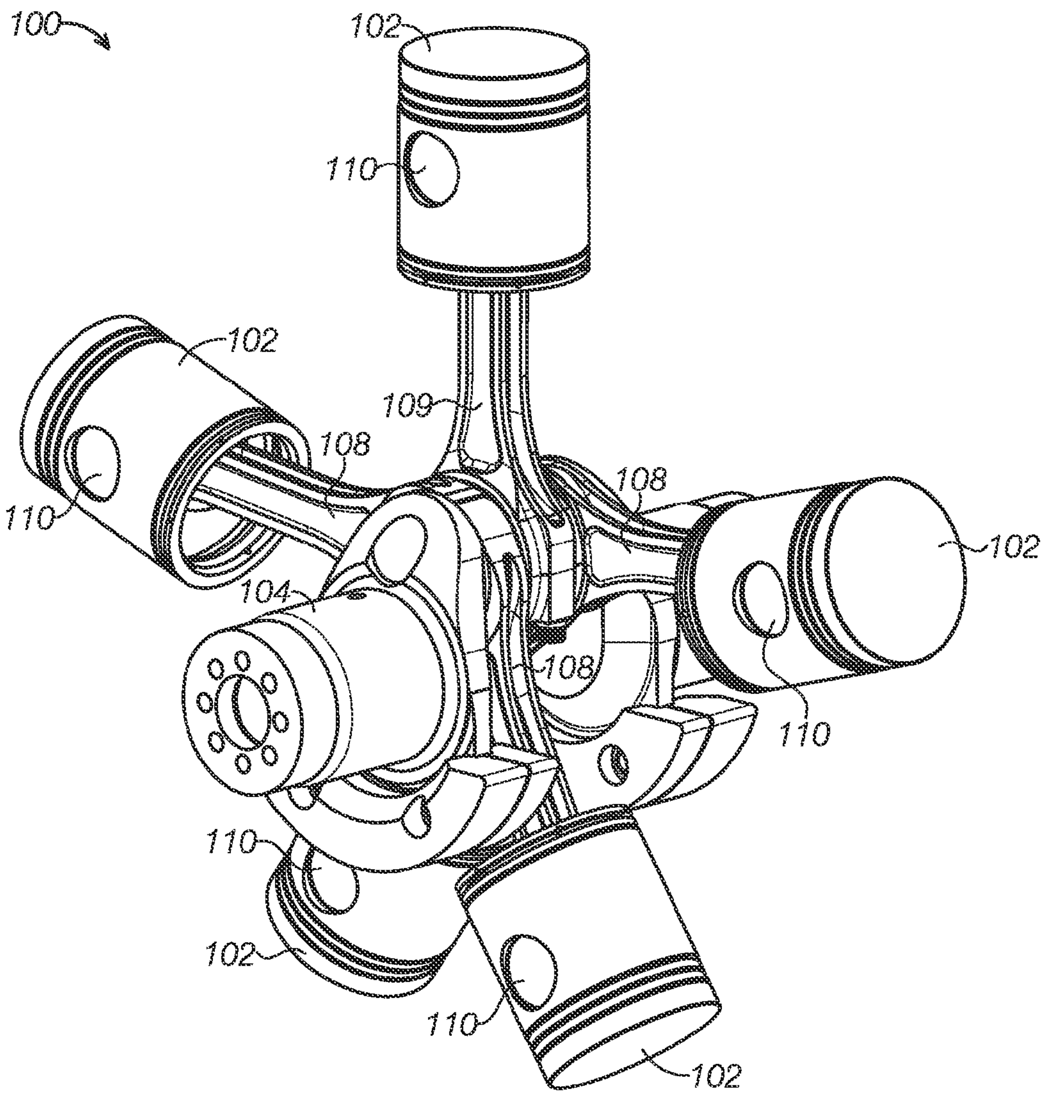
FIG. 2 is a perspective view of an example embodiment of the improved radial engine piston-crankshaft interface.
Figure 3:
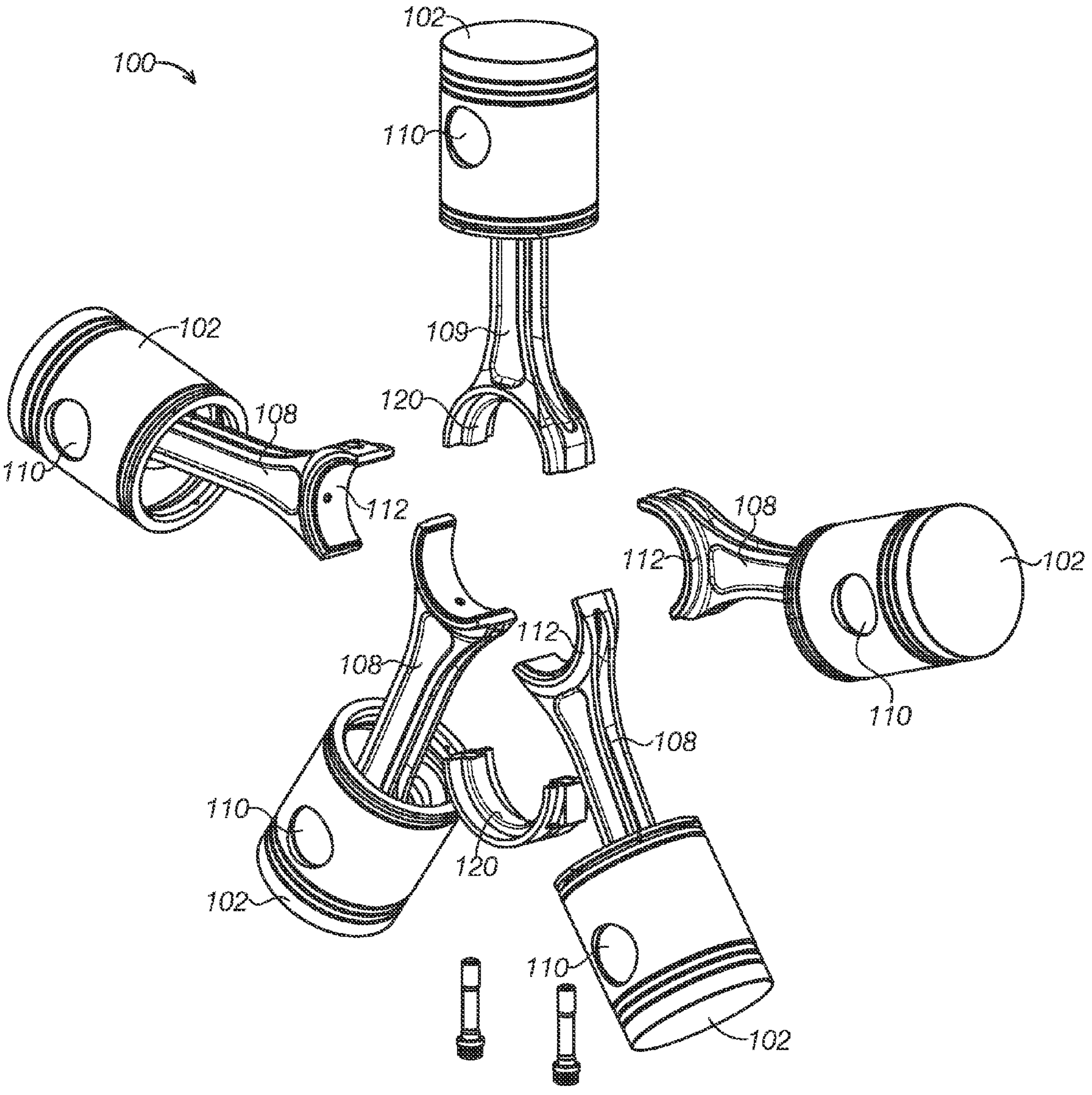
FIG. 3 is an exploded perspective view of the example improved radial engine piston-crankshaft interface of FIG. 2, showing the various connecting rod bearing surfaces that interface with the crankshaft.

In FIGS. 2 and 3, radial engine crankshaft interface 100 is comprised of a plurality of pistons 102 arranged in a radial configuration around a center crankshaft 104, wherein center crankshaft 104 possesses a crankshaft throw 106, which is offset from the longitudinal axis of center crankshaft 104, and inscribes a circle a the longitudinal axis as center crankshaft 104 rotates. One piston 102 possesses a connecting rod 109 with a first end 110 pivotably affixed to piston 102, and a second end possessing a traditional round bearing 120. Each of the remaining pistons possesses a connecting rod 108 with a first end 110 pivotably affixed to piston 102 and a second end possessing a slipper bearing 112 with a bearing surface that is shaped in an arc, the arc being of a substantially similar radius as crankshaft throw 106 and disposed upon a portion of crankshaft throw 106. As will be discussed in greater detail below, plurality of pistons 102 is divided into a plurality of subsets of pistons, each of the plurality of subsets of pistons being aligned in a plane that is parallel to the planes of the other subsets of pistons, and, except for one piston 102 possessing connecting rod 109 which is located centrally on crankshaft throw 106 between the remaining pistons 102, each piston 102 in each of the plurality of subsets of pistons possessing a connecting rod 108 with a slipper bearing 112 pith a bearing surface in contact with the crankshaft throw 106. Piston 102 that is located centrally is equipped with a traditional round bearing 120 as is well known in the art, which fully encircles crankshaft throw 106. This configuration maximizes engine density (i.e. power to weight ratio). By using a two-stroke design the crankshaft throw to connecting rod 108 interface is simplified by the use of a slipper bearing 112 end on connecting rod 108, which overcomes the challenge a radial configuration presents to adequately connect and carry the load of all pistons 102 and connecting rods 108 and 109.

Pistons 102, center crankshaft 104, and connecting rods 108 and 109 are of a construction that is commonly known in the aviation or engine industry, constructed from materials such as aluminum, steel, chrome, titanium, ceramics, or any combination of materials now known or later developed suitable to the pressures and temperatures experienced in a two-cycle diesel engine. Connecting rods 108 and 109 are connected to pistons 102 at first ends 110 by any method known in the relevant art, such as a commonly-implemented and used connecting pin, or any other method that allows connecting rod 108 and 109 to rotate laterally within piston 102 with respect to the plane of the subset of pistons the piston 102 belongs in, as crankshaft throw 106 orbits around the longitudinal axis of center crankshaft 104 as center crankshaft 104 rotates.

As will be appreciated by a person skilled in the relevant art, offsetting crankshaft throw 106 from the longitudinal axis of center crankshaft 104 creates a lever operably connected to connecting rods 108 and 109 that in turn facilitates pistons 102 in effecting rotation of center crankshaft 104. As the fuel-air mixture within each cylinder around the radial engine fires sequentially, the heat of fuel combustion increases the pressure of the combustion gasses within the cylinder, exerting a force against the offset crankshaft throw 106, thereby contributing energy to the rotational movement of center crankshaft 104. The offset of crankshaft throw 106 can be seen depicted in FIG. 4A, where the longitudinal axis of center crankshaft 104 is depicted by a dashed line.

Slipper bearings 112 and round bearing 120 can be constructed from any materials now known or later developed in the art suitable to withstanding the pressures of the combustion cycle, with respect to expected loads upon the engine. Such materials can include aluminum, brass, steel, chrome, copper, titanium, ceramic, composite, plastic, or any combination of the same or other suitable material. Furthermore, slipper bearings 112 and round bearing 120 can be manufactured with a smooth surface, intended to move over a film of lubricating oil, or alternatively ball bearings, needle bearings, roller bearings, or any other suitable bearing construction, or in conjunction with a film of lubricating oil or any other lubricating fluid, with due consideration given to the open ends of slipper bearings 112.

Figure 4A:
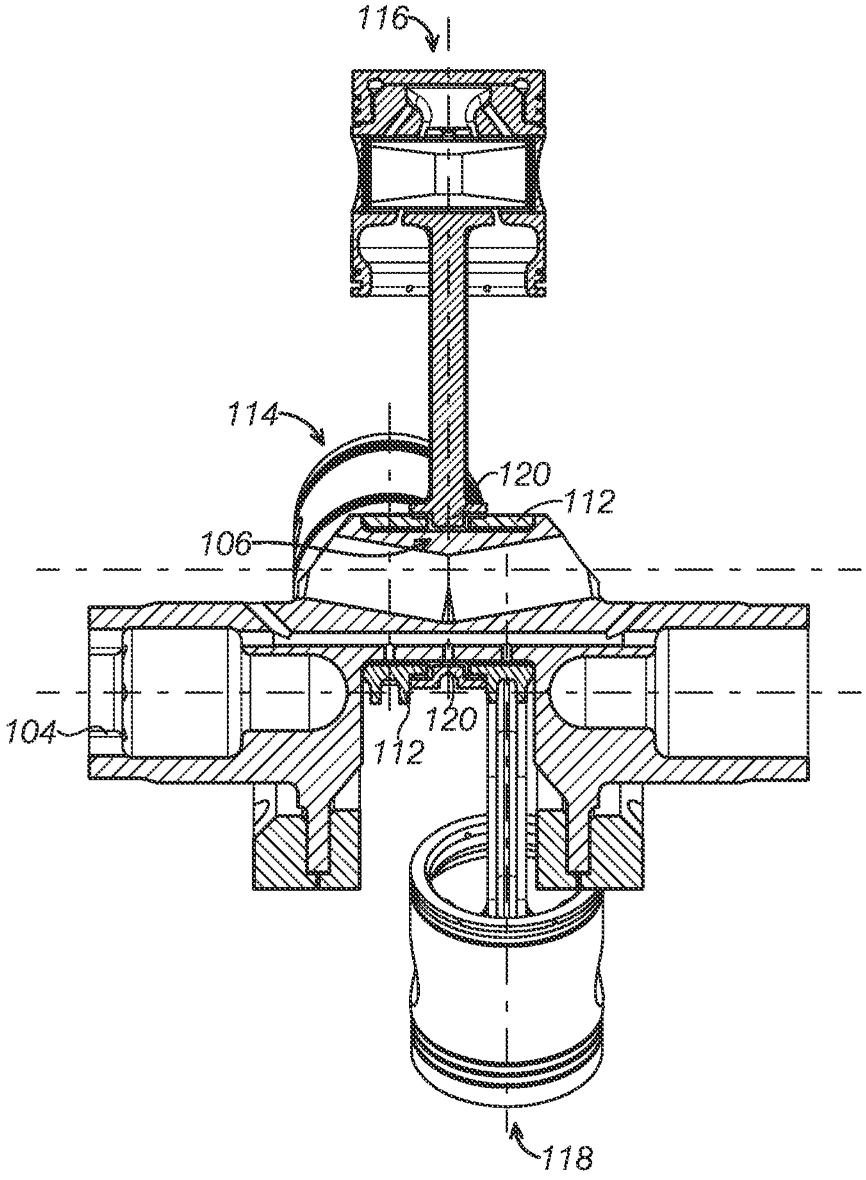
FIG. 4A is a side cutaway view of the improved radial engine piston-crankshaft interface of FIG. 2, showing the pistons and their associated connecting rod bearings in multiple parallel planes.

In FIG. 4A, the bearing surface of crankshaft throw 106 is depicted as an integral portion of crankshaft throw 106. It will be appreciated by a person skilled in the relevant art that crankshaft throw 106 can be alternatively fitted with removable bearing insert that goes between the end of connecting rods 108 and 109, a crankshaft throw 106, as engine applications dictate, to allow for servicing and replacement. Such an insert can be constructed from similar materials as slipper bearings 112 and round bearing 120.

Figure 4B:
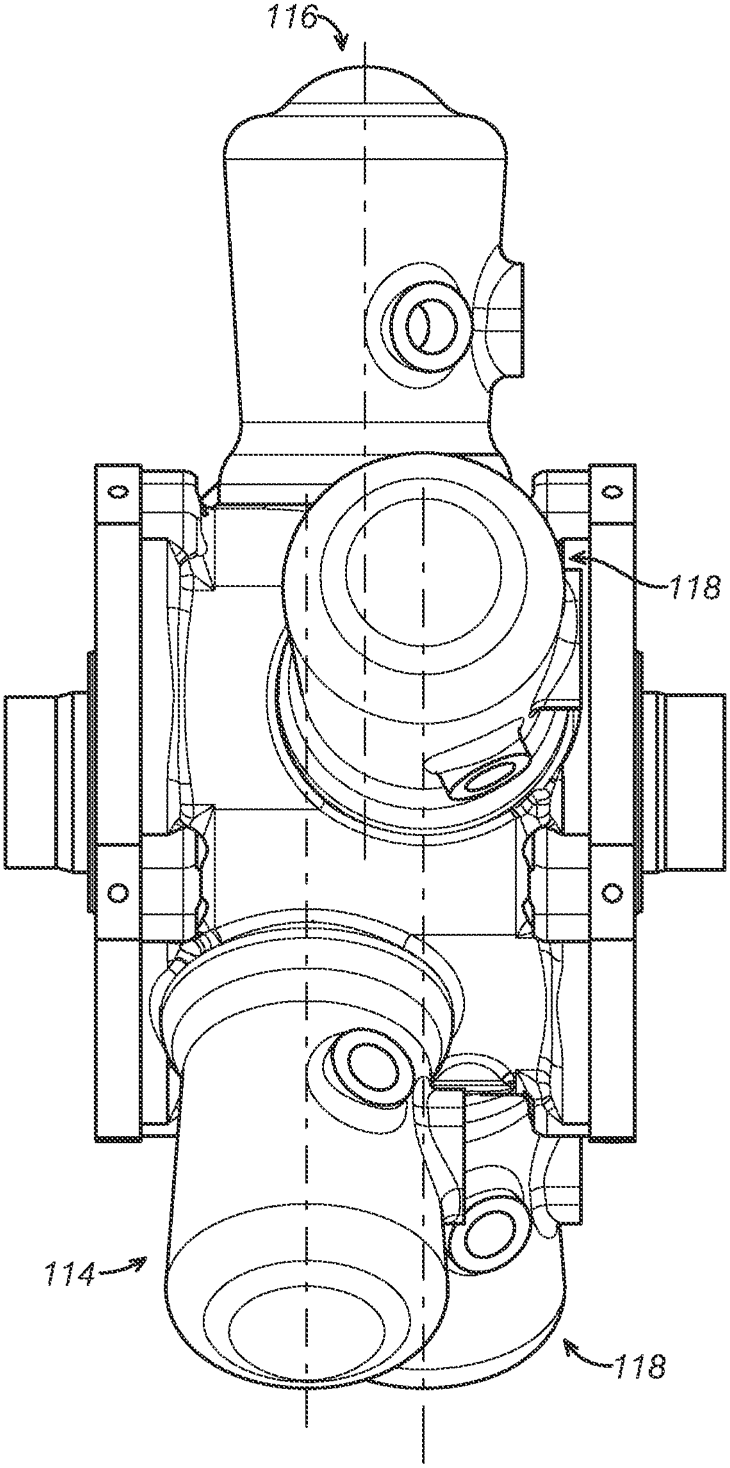
FIG. 4B is a side view of the improved radial engine piston-crankshaft interface of FIG. 2, showing the pistons in their associated cylinders, in multiple parallel planes.

FIGS. 4A and 4B illustrate this arrangement of pistons around center crankshaft 104. The five pistons 102 in the example engine embodiment are arrayed in three parallel planes upon crankshaft throw 106, with two pistons 102 in a front plane 114, two pistons 102 in a rear plane 118, and one piston 102 in a center plane 116. The pistons are placed in the three planes in a staggered fashion to maximize the available surface area where each slipper bearing 112 interfaces with crankshaft throw 106, and have the further benefit of helping preserve the dynamic balance of the engine. It will be understood by a person skilled in the relevant art that implementations with greater than five pistons associated with a single crankshaft thrown 106 are possible by increasing the number of pistons in front plane 114 and rear plane 118. For example, a seven piston arrangement is possible by placing three pistons 102 each in front plane 114 and rear plane 118; likewise, a nine piston arrangement could be achieved using four pistons 102 each in front plane 114 and rear plane 118.

Turning to FIG. 4A, the configuration of connecting rods 108 and 109 to crankshaft throw 106 is visible. For the front plane 114 and rear plane 118 that are each shared by two pistons 102, a slipper bearing 112 is used to interface with crankshaft throw 106. Each connecting rod 108 terminates with slipper bearing 112, a partial semicircle that floats on top of crankshaft throw 106. When used with a two-stroke combustion cycle engine, slipper bearing 112 is maintained in constant pressure contact with crankshaft throw 106. Single piston 102 on center plane 116 utilizes a traditional round bearing 120 for connecting rod 109 connection, with a cap bolted onto the connecting rod traditional round bearing 120 end, seen in FIG. 3, so as to fully capture crankshaft throw 106. The use of traditional round bearing 120 which fully encircles crankshaft throw 106 also serves to secure and stabilize slipper bearings 112 for remaining pistons 102, in the event there is a lapse in pressure on slipper bearings 112. Without such securement, a lapse in pressure (for example, due to a failure in the cylinder to hold compression) could result in slipper bearing 112 coming away from crankshaft throw 106, and interfering with other internal components of the engine.

In FIG. 4A, piston 102 in center plane 116 has connecting rod 109 ending in traditional round bearing 120. The sides of traditional round bearing 120 can be seen to have two flanges that impinge upon slipper bearings 112 for pistons 102 located in front plane 114 and rear plane 118 so as to act as retaining rings and capture the respective pistons' 102 slipper bearings 112. The implementation of slipper bearings 112 further improves engine performance by promoting the free flow of lubricating oil throughout the crankshaft throw 106, and reduces the pressure and potential friction that would result from a smaller contact area, as would be present in a prior art configuration in FIGS. 1A and 1B, where all pistons were arranged in a single plane.

Figure 5A:
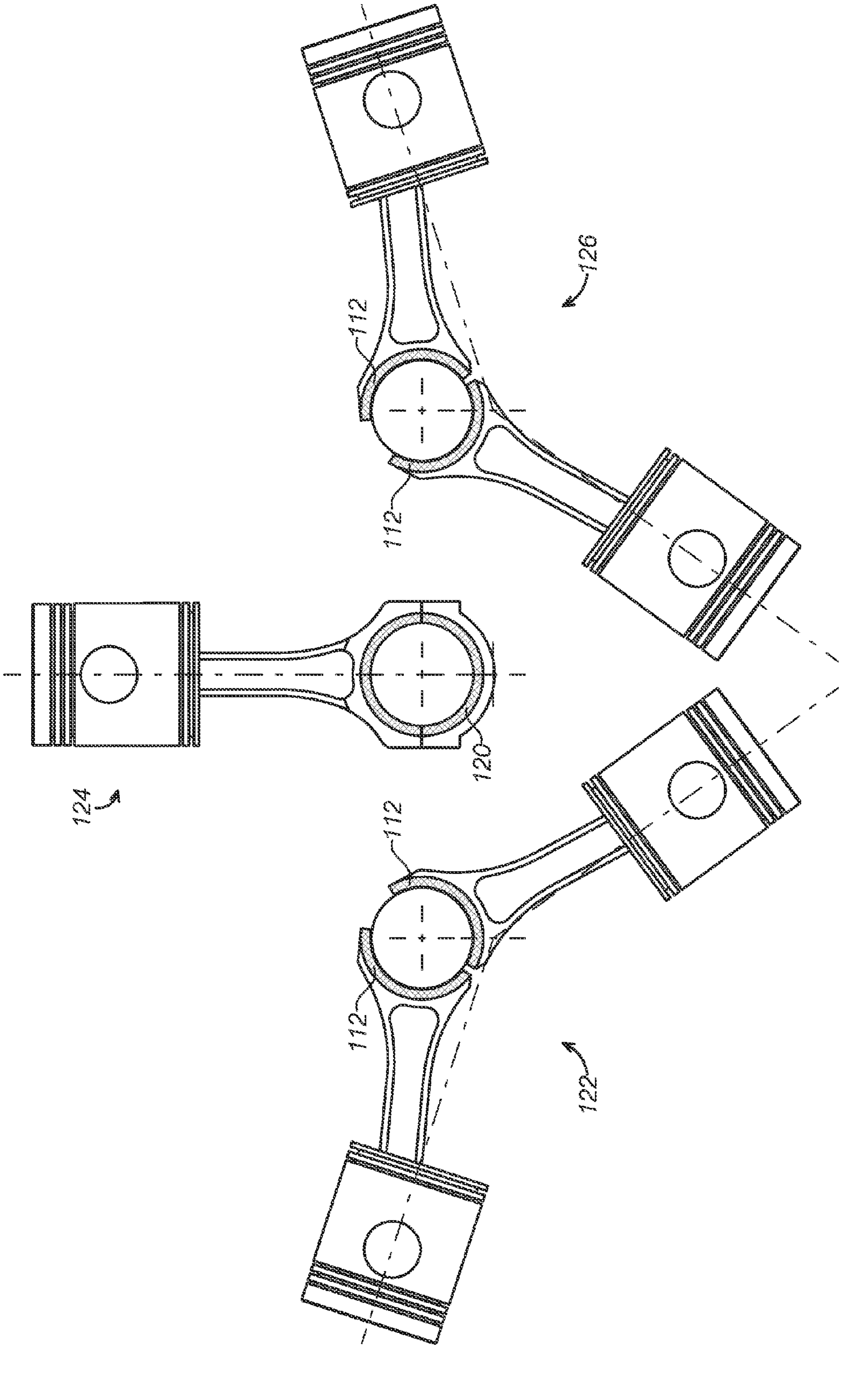
FIG. 5A is a front exploded view of the improved radial engine piston-crankshaft interface of FIG. 2, showing the pistons in their various subsets.
Figure 5B:
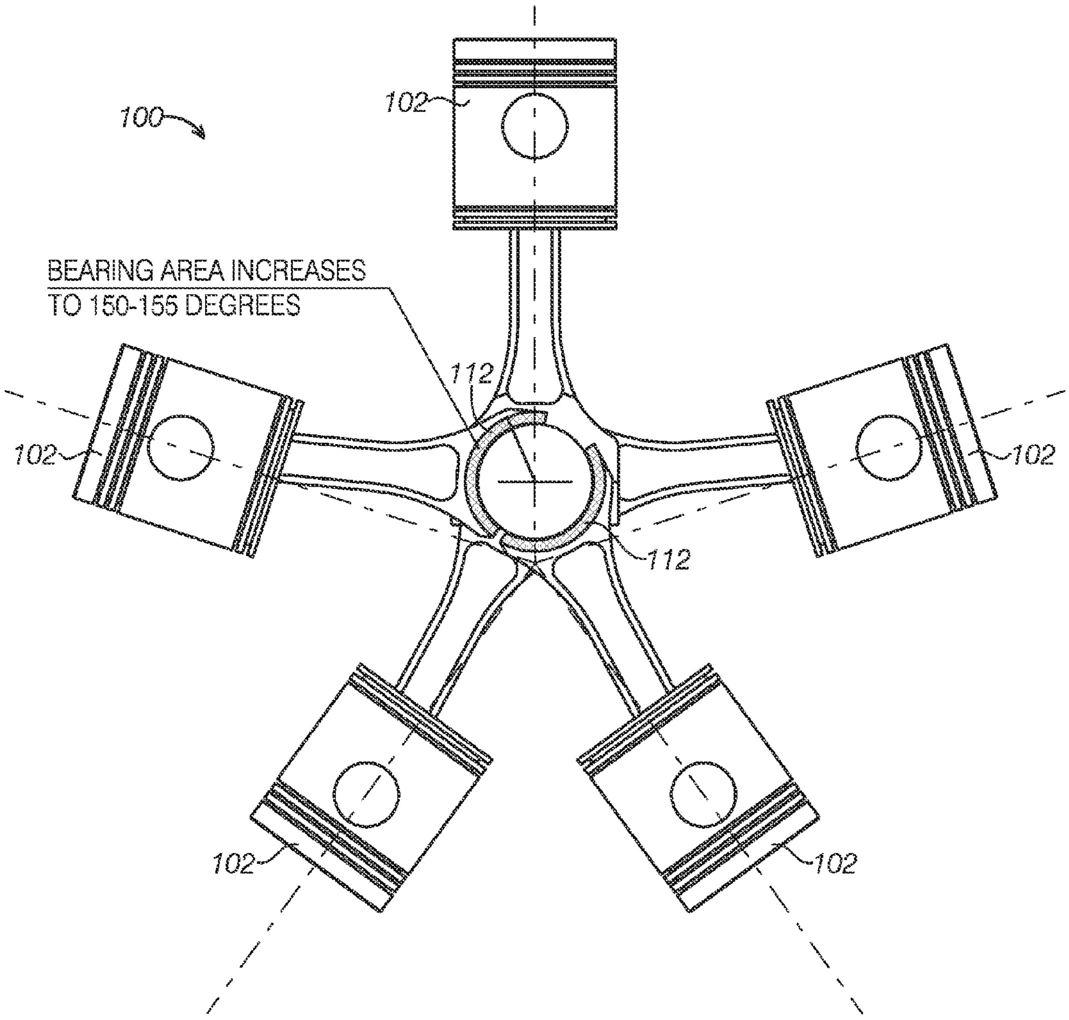
FIG. 5B is a front component view of the improved radial engine piston-crankshaft interface of FIG. 2, showing the improved contact angles of the pistons' associated slipper bearings relative to the crankshaft.

FIGS. 5A and 5B show the staggered arrangement of the pistons in each of their respective planes to ensure engine balance. FIG. 5A shows first piston subset 122 which corresponds to front plane 114, second piston subset 124 which corresponds to center plane 116, and third piston subset 126 which corresponds to rear plane 118. Each of the pistons is this arranged so that no two adjacent pistons are in the same plane. The effective result of this arrangement, as noted in FIG. 5B, is that Me available bearing area for each slipper bearing 112 where it interfaces crankshaft throw 106 is increased to approximately 150-155 degrees for five-cylinder implementations with two pistons 102 each in front plane 114 and rear plane 118. This is at least 100 degrees greater than would be possible if five pistons are arranged in a single plane, as shown in FIG. 1B. The corresponding increase in bearing area would be less where more pistons are deployed in front plane 114 and rear plane 118. It will be recognized by a person skilled in the relevant art that although second piston subset 124 is shown in a topmost position with respect to the figure's plane of reference, there is no particular technical requirement that the various pistons 102 in front plane 114, center plane 116, and rear plane 118 be oriented with any particular piston 102 in any particular position.

It will also be appreciated by a person skilled in the relevant art that engine configurations with greater numbers of cylinders than nine could be accomplished with the disclosed invention by adding additional banks of cylinders, each with their own crankshaft throw 106. For example, fifteen-cylinder engine could be implemented by using a central crankshaft 104 with three crankshaft throws 106, each preferably offset from the others by 120 degrees, with each crankshaft throw 106 having five cylinders arranged in three planes as disclosed herein.

The above disclosure specifically contemplates implementation in a two-cycle compression ignition engine, also known as a diesel engine. In such an engine, as a piston travels upward, air is compressed, and at approximately the top of the stroke, atomized fuel oil is injected into the cylinder, which ignites due to heat generated by compression of the air. As the fuel ignites, it creates hot gasses which expand and, as cylinder pressure increases with the heat of combustion, apply downward force upon the piston. As the piston travels down, it uncovers one or more exhaust and intake ports. The hot gasses expand out of the exhaust port(s), while fresh air is either drawn in or mechanically forced in by a turbo or supercharger through the intake ports, clearing the cylinder of the combustion products. The piston reaches the bottom of its stroke, and begins to travel up, compressing the fresh air and starting a new combustion cycle. It will be recognized person skilled in the relevant art that the disclosed radial engine piston-crankshaft interface can also be implemented on a spark-ignited two-cycle engine, such as one that burns gasoline, or a gas-oil mixture. The combustion cycle is substantially identical to the above-described compression ignition cycle, with the exception that fuel may be introduced using a carburetor as opposed to direct injection, and ignition is supplied using a timed spark plug.

Finally, although not preferred, it is possible to implement the disclosed radial engine piston-crankshaft interface on a more common four-cycle spark ignited engine, if the overlap from traditional round bearing 120 is sufficient to retain slipper bearings 112 on the intake stroke, when a piston is not under pressure. Crankshaft throw 106 of center crankshaft 104 may also be modified to partially overlap slipper bearings 112 opposite the overlap of traditional round bearing 120 if necessary.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A radial engine crankshaft interface, comprising a plurality of pistons arranged in a radial configuration around a center crankshaft, wherein:

the center crankshaft possesses a crankshaft throw;

each of the pistons possesses a connecting rod with a first end pivotably affixed to the piston and a second end possessing a slipper bearing with a bearing surface that is shaped in an arc, the arc being of a substantially similar radius as the crankshaft throw and disposed upon a portion of the crankshaft throw; and the plurality of pistons is divided into a plurality of subsets of pistons, each of the plurality of subsets of pistons being aligned in a plane that is parallel to the planes of the other subsets of pistons, and each piston in each of the plurality of subsets of pistons possessing a connecting rod with a slipper bearing with a bearing surface in contact with the crankshaft throw.

2. The radial engine crankshaft interface of claim 1, wherein the plurality of subsets of pistons is comprised of three subsets of pistons, with one of the subsets of pistons being aligned in a plane that is located between the planes of the other two subsets of pistons; and the subset of pistons aligned in a plane located between the planes of the other two subsets of pistons is further comprised of a single piston with a connecting rod, the connecting rod having a bearing surface that encircles the crankshaft throw.

3. The radial engine crankshaft interface of claim 2, wherein the bearing surface of the connecting rod of the single piston that encircles the crankshaft throw further secures the slipper bearings of the connecting rods of the remaining plurality of pistons to the crankshaft throw.

4. The radial engine crankshaft interface of claim 1, wherein the plurality of pistons arranged in a radial configuration are from five to seven pistons.

5. The radial engine crankshaft interface of claim 4, wherein the plurality of pistons arranged in a radial configuration are divided into a first subset of two or three pistons, a second subset of one piston, and a third subset of two or three pistons.

6. The radial engine crankshaft interface of claim 5, wherein the one piston of the second subset possesses a connecting rod with a bearing that encircles the crankshaft throw of the center crankshaft.

7. The radial engine crankshaft interface of claim 6, wherein the bearing that encircles the crankshaft throw further overlaps and secures the slipper bearings of the connecting rods of the pistons in the first subset of two or three pistons and the third subset of two or three pistons to the crankshaft throw.

8. The radial engine crankshaft interface of claim 5, wherein each bearing surface of the slipper bearings of the connecting rods of the pistons in the first subset and third subset contact a maximized area on the crankshaft throw.

9. A radial engine crankshaft interface, comprising:

a crankshaft with a crankshaft throw;

a plurality of sets of pistons, each set comprising no more than four pistons that are aligned in a plane parallel to the other sets, and each piston in each set possessing a connecting rod, wherein each connecting rod possesses:

an end proximal to and movably affixed to its associated piston; and an end distal to its associated piston that possesses a slipper bearing, the slipper bearing having a bearing surface substantially shaped in an arc with a radius substantially identical to the radius of the crankshaft throw; and at least one piston located between two of the plurality or sets of pistons, the at least one piston having a connecting rod with an end distal to the at least one piston, the distal end having a bearing that encircles the crankshaft throw.

10. The radial engine crankshaft interface of claim 9, wherein the bearing of the at least one piston located between two of the plurality of sets of pistons overlaps at least a part of the slipper bearing of each piston in each of the sets of pistons.

11. The radial engine crankshaft interface of claim 10, wherein the plurality of sets of pistons is two sets, and each set comprises no more than two pistons.

12. The radial engine crankshaft interface of claim 11, wherein each piston in a given one of the plurality of sets of pistons has at least one piston in a different one of the plurality of sets of pistons between it and another piston in the given one of the plurality of sets of pistons.

13. The radial engine crankshaft interface of claim 11, wherein the slipper bearing of each piston contacts the crankshaft throw over at least 150 degrees of crankshaft throw surface.

14. The radial engine crankshaft interface of claim 10, wherein the plurality of sets of pistons is two sets, and each set comprises no more than three pistons.

15. A radial engine, comprising:

five to nine pistons in a radial configuration around a center crankshaft with a crankshaft throw, wherein:

two to four of the pistons are in a first subset and aligned in a first plane of movement;

two to four of the pistons are in a second subset and aligned in a second plane of movement, the second plane of movement parallel to the first plane of movement; and one piston is located in a center plane of movement parallel to the first and second planes of movement, the one piston positioned between the first subset and second subset of pistons;

the pistons in the first subset and second subset interface the center crankshaft using slipper bearing in partial contact with the crankshaft throw, the partial contact being a maximized area of the crankshaft throw for each slipper bearing; and the piston located in the center plane of movement interfaces the center crankshaft using a bearing that encircles the crankshaft throw, and partially overlaps the slipper bearings of the pistons in the first subset and second subset.

16. The radial engine of claim 15, wherein the engine is a two-cycle compression ignition engine.

17. The radial engine of claim 15, wherein the engine is a two-cycle spark ignition engine.

18. The radial engine of claim 15, wherein the first subset and second subset contain identical numbers of pistons.

19. The radial engine of claim 18, wherein the first subset and second subset each contain two pistons.

20. The radial engine of claim 15, wherein the first subset and second subset contain different numbers of pistons.

* * * * *